(12) United States Patent
Kim et al.

(10) Patent No.: US 8,419,182 B2
(45) Date of Patent: Apr. 16, 2013

(54) GLASSES

(75) Inventors: Yunjoo Kim, Pyeongtaek-si (KR); Alain Miklitarian, Paris (FR); Doyoung Kim, Pyeongtaek-si (KR); Youngkook Seo, Pyeongtaek-si (KR); Yooseok Kim, Pyeongtaek-si (KR); Jaeho Kim, Pyeongtaek-si (KR)

(73) Assignees: LG Electronics Inc., Seoul (KR); Alain Mikli International, Paris (FR)

( * ) Notice: Subject to any disclaimer, the term of this patent is extended or adjusted under 35 U.S.C. 154(b) by 0 days.

(21) Appl. No.: 13/234,432

(22) Filed: Sep. 16, 2011

(65) Prior Publication Data

US 2012/0081654 A1 Apr. 5, 2012

(30) Foreign Application Priority Data

Oct. 4, 2010 (KR) ........................ 10-2010-0096333

(51) Int. Cl.
*G02C 5/12* (2006.01)
(52) U.S. Cl.
USPC ........................................ 351/137

(58) Field of Classification Search .............. 351/76–82, 351/124, 136–139
See application file for complete search history.

(56) References Cited

U.S. PATENT DOCUMENTS

| | | | |
|---|---|---|---|
| 4,252,422 A | 2/1981 | Speckhart | |
| 4,787,729 A * | 11/1988 | Ruffen | 351/137 |
| 5,980,038 A * | 11/1999 | Chen | 351/120 |
| 2011/0025974 A1* | 2/2011 | Schepke | 351/105 |

FOREIGN PATENT DOCUMENTS

| | | |
|---|---|---|
| JP | 2000-284232 | 10/2000 |
| JP | 2008-185743 | 8/2008 |
| KR | 20-2009-0005955 | 6/2009 |
| KR | 10-0951225 | 4/2010 |

OTHER PUBLICATIONS

Korean Notice of Allowance issued in KR Application No. 10-2010-0096333 dated Apr. 7, 2011 (full Japanese text and full English translation).

* cited by examiner

*Primary Examiner* — Huy K Mai
(74) *Attorney, Agent, or Firm* — KED & Associates LLP (57) ABSTRACT

Glasses are disclosed. The glasses can improve fitting of a viewer.

11 Claims, 10 Drawing Sheets

GLASSES

Pursuant to 35 U.S.C. §119(a), this application claims the benefit of earlier filing date and right of priority to Korean Application No. 10-2010-0096333, filed on Oct. 4, 2010, the contents of which is hereby incorporated by reference herein in their entirety.

TECHNICAL FIELD

The present invention relates to glasses, and more particularly, to glasses that can prevent 3D glasses from slipping down when a viewer doubly wears the 3D glasses in a state that the viewer wears glasses for vision correction and can improve fitting of temple portions.

BACKGROUND ART

Generally, a display device means a device that displays an externally input video signal. The display device includes a monitor displaying a video received from a computer and a television displaying video and audio transmitted from a broadcasting station. At the same time, the display device includes all the devices displaying externally input video.

Recently, a large scaled display device of high picture quality, which is provided with a flat panel display module, such as a liquid crystal display panel (LCD) or a plasma display panel (PDP), has received much attention.

Meanwhile, with the manufacture of 3D image contents and the development of the display technology, various contents, such as 3D movies, 3D sports broadcasting, and 3D games, have been increased, whereby a display device displaying 3D video has rapidly come into wide use.

Stereoscopic image displaying 3D depends on the principles of stereo eyesight through two eyes. A binocular parallax based on an interval between two eyes spaced apart from each other at about 65 mm is an important factor that allows a person to feel a three-dimensional effect.

In other words, when left and right eyes of a human body respectively view related 2D images, if the two images are transmitted to the brain through the retina, the brain unites the images with each other to reproduce the original depth and reality of the 3D images. This ability will be referred to as stereography.

Generally, there is suggested a method for viewing 3D video in a state that a viewer wears specific glasses (3D glasses or stereoscopic glasses). The 3D glasses can be classified into polarized glasses based on vibration direction or rotation direction of polarized light, time-sharing glasses that alternately display left and right images through switching of the left and right images, and pulfrich glasses that transfer light of different kinds of brightness to left and right eyes.

In the mean time, 3D glasses are provided with a nose pad portion fixed to a frame. At this time, if the viewer doubly wears the 3D glasses in a state that he/she wears glasses for vision correction, a problem occurs in that specific glasses may slip down or fitting of temple portions may be deteriorated.

DESCRIPTION OF THE INVENTION

Technical Problems

Accordingly, the present invention is directed to glasses that substantially obviate one or more problems due to limitations and disadvantages of the related art.

An object of the present invention is to provide glasses that can prevent 3D glasses from slipping down when a viewer doubly wears the 3D glasses in a state that the viewer wears glasses for vision correction and can improve fitting of temple portions.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solutions

To achieve these objects and other advantages and in accordance with the purpose of the invention, as embodied and broadly described herein, glasses according to the present invention comprises a frame including a plurality of lens holders and a bridge connecting the lens holders adjacent thereto; a holder mounted to the bridge; and a support pad rotatably mounted to the holder.

Also, the support pad includes a main body including a hinge portion provided in the holder and tip portions extended with a predetermined curvature from both end portions of the hinge portion, and a wire arranged in the main body.

The tip portions are formed of silicon.

Also, the holder and the hinge portion are respectively provided with first and second protrusions for engaging different edge portions with each other depending on a rotational angle of the support pad.

Each of the protrusions maintains the rotational angle of the support pad in a state that different edge portions are engaged each other depending on a plurality of sub-rotational angles between a minimum rotational angle and a maximum rotational angle.

Also, each of the protrusions has a polygonal structure to engage different edge portions with each other depending on the rotational angle of the support pad.

The holder has an insertion hole, and the support pad has a hinge shaft inserted into the insertion hole.

Also, the hinge shaft is a cam shaft.

Rotation of the cam shaft is restricted by the inner circumference of the insertion hole within the angle range smaller than the minimum rotational angle of the support pad or greater than the maximum rotational angle of the support pad.

Also, the holder has a hook portion, and the frame has a catcher portion for inserting the hook portion.

The frame includes a front frame and a rear frame, and the holder is supported by the inner circumference of the rear frame in a state that one end portion of the holder passes through the rear frame.

Also, the support pad is rotated along a direction perpendicular to a longitudinal direction of the bridge.

The support pad is rotated at an angle of 0° to 90°.

Advantageous Effects

According to the glasses of the embodiments of the present invention, fitting of the viewer can be improved.

Also, according to the glasses of the embodiments of the present invention, the 3D glasses can be prevented from slipping down when the viewer wears the 3D glasses in a state that he/she wears glasses for vision correction, and fitting of temple portions can be improved.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2A to FIG. 4B are perspective views illustrating main elements of glasses illustrated in FIG. 1;

FIG. 5 to FIG. 6C are diagrams illustrating an operation state of a holder and a support pad; and FIG. 7 to FIG. 8B are conceptual views illustrating a use state of glasses according to one embodiment of the present invention.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to limit the technical scope of the present invention.

Also, wherever possible, the same reference numbers will be used throughout the drawings and the specification to refer to the same or like parts, and their repeated description will be omitted. The size and shape of each element illustrated for convenience of description may be overstated or understated.

In the mean while, although terminologies including ordinal numbers such as first and second can be used for various elements, the elements are not limited by the above terminologies, and the above terminologies are used to differentiate one element from the other elements.

Figure 1:
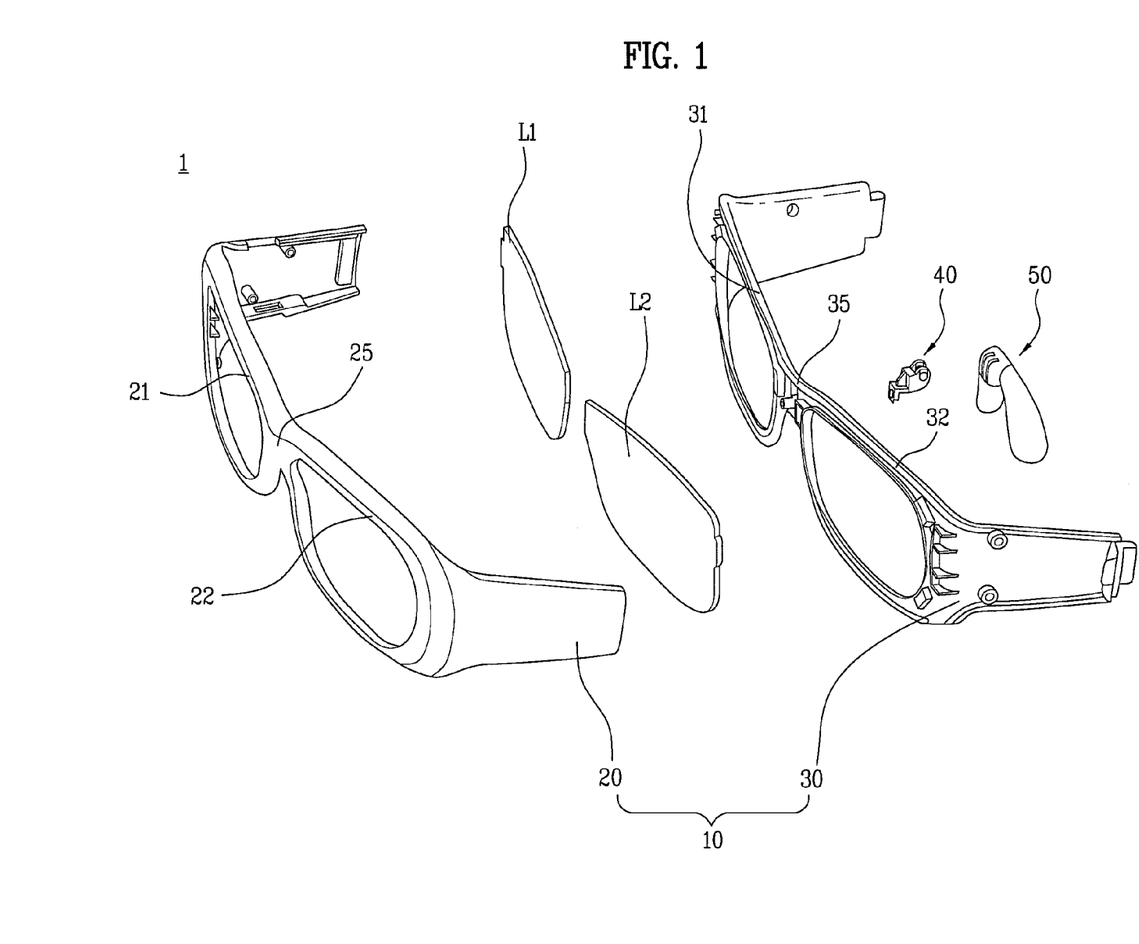
FIG. 1 is an exploded perspective view illustrating glasses according to one embodiment of the present invention.
Figure 5:
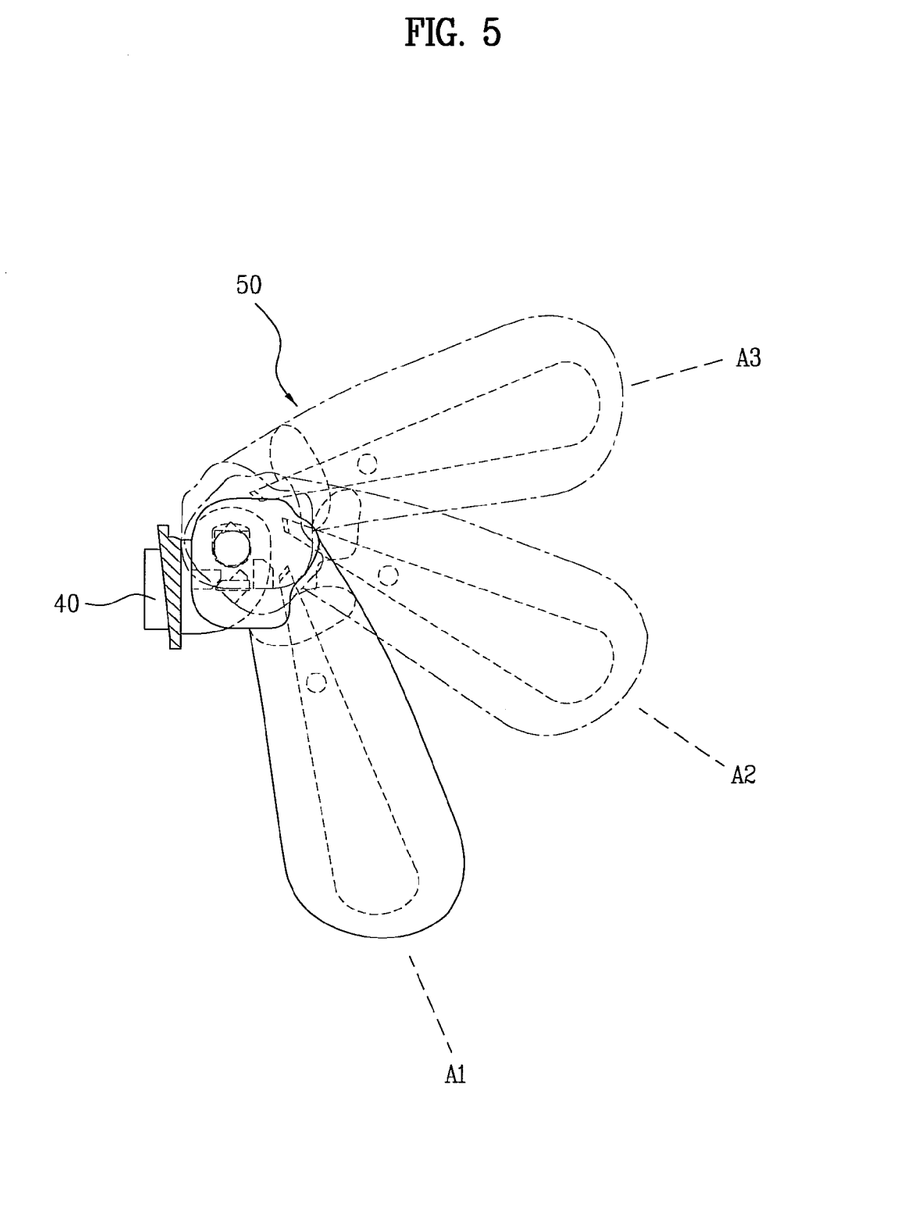
Figure 6A:
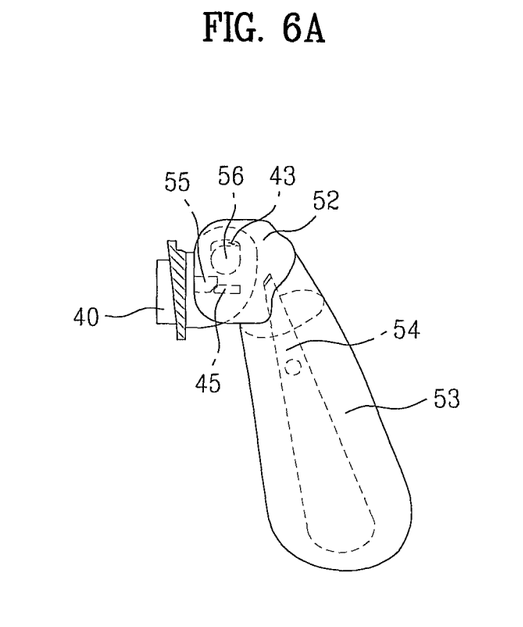
Figure 6B:
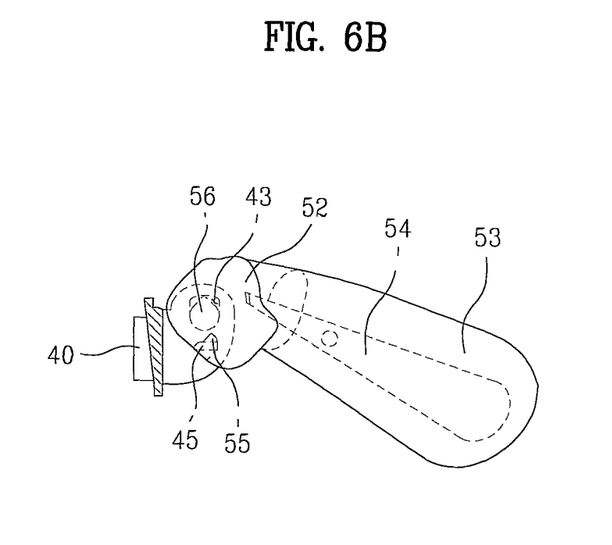
Figure 6C:
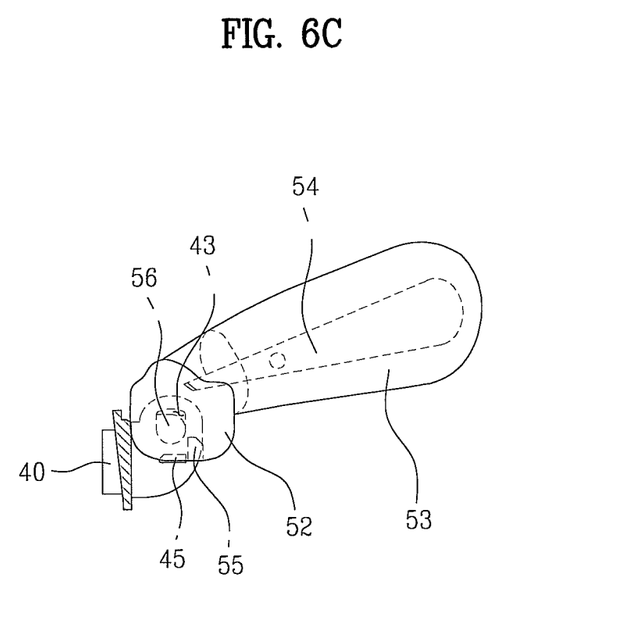
Figure 7:
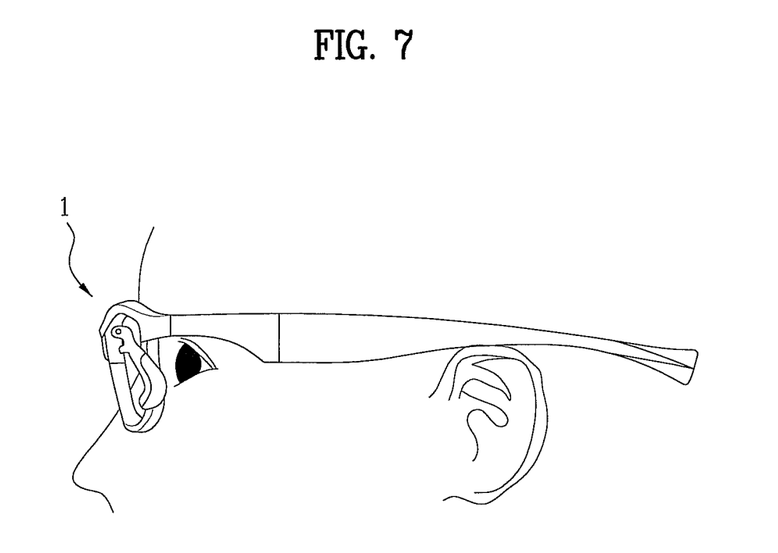
Figure 8A:
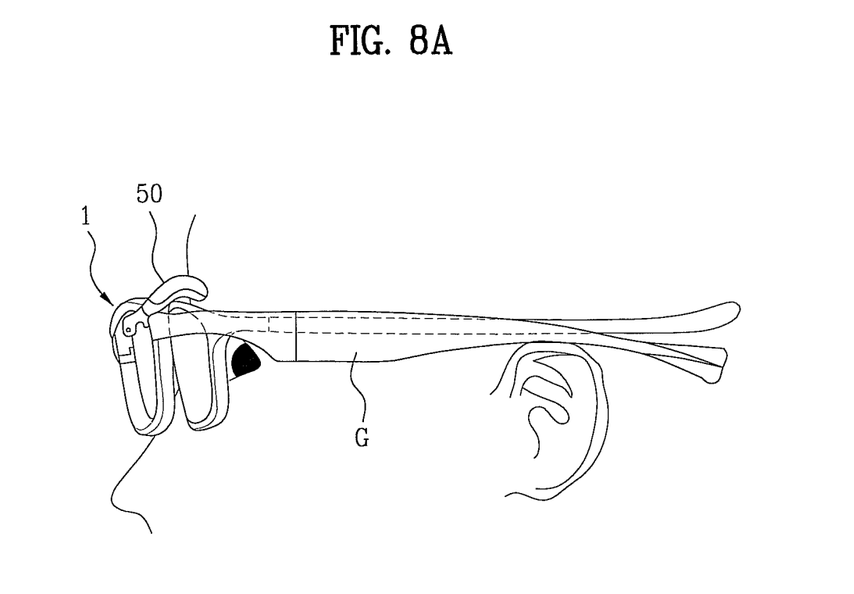
Figure 8B:
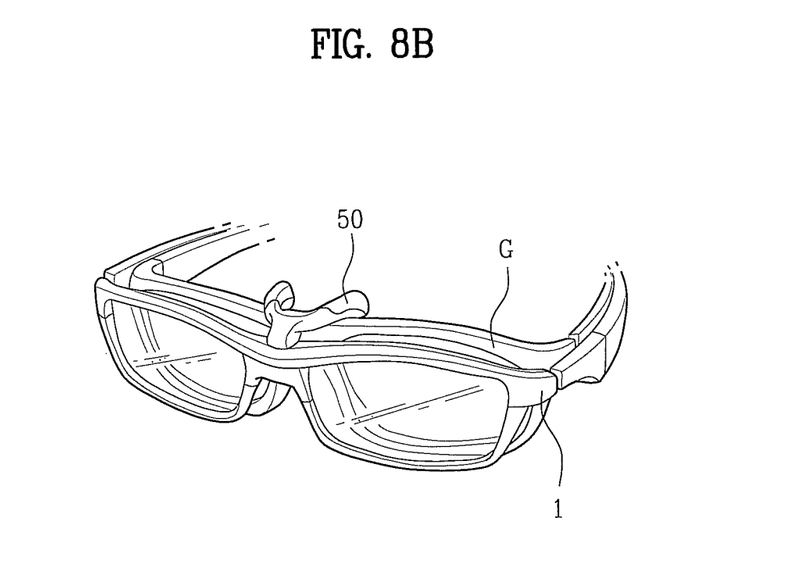

FIG. 1 is an exploded perspective view illustrating glasses according to one embodiment of the present invention, FIG. 2A to FIG. 4B are perspective views illustrating main elements of glasses illustrated in FIG. 1, and FIG. 5 to FIG. 6C are diagrams illustrating an operation state of a holder and a support pad, and FIG. 7 to FIG. 8B are conceptional views illustrating a use state of glasses according to one embodiment of the present invention.

Glasses 1 according to one embodiment of the present invention include a plurality of lens holders 11 and 12, a frame including a bridge 15 connecting adjacent lens holders 11 and 12, a holder 40 mounted to the bridge 15, and a support pad 50 rotatably mounted to the holder 40.

Also, the support pad 50 includes a main body 51 and a wire 54 arranged in the main body 51, wherein the main body 51 includes a hinge portion 52 provided in the holder 40 and tip portions 53 respectively extended with a predetermined curvature from both end portions of the hinge portion 52.

The tip portions 53 may be formed of silicon.

Also, first and second protrusions 45 and 55 are respectively provided at the holder 40 and the hinge portion 52 to engage different edge portions with each other depending on a rotational angle of the support pad 50.

Also, the first and second protrusions 45 and 55 can maintain the rotational angle of the support pad 50 in a state that different edges portions are linked with each other depending on a plurality of sub-rotational angles A2 between a minimum rotational angle A1 and a maximum rotational angle A3 of the support pad.

Also, the first and second protrusions 45 and 55 may have a polygonal structure to engage different edge portions with each other depending on the rotational angle of the support pad 50.

Also, the holder 40 has an insertion hole 43, and the support pad 50 has a hinge shaft inserted into the insertion hole 43.

Also, the hinge shaft may be a cam shaft 56.

Also, rotation of the cam shaft may be restricted by the inner circumference of the insertion hole 43 of the holder 40 within the angle range smaller than the minimum rotational angle A1 of the support pad 50 or greater than the maximum rotational angle A3 of the support pad 50.

The holder 40 may further be provided with a hook portion 42, and the frame 10 may be provided with a catcher portion for inserting the hook portion 42.

Also, the frame 10 includes a front frame 20 and a rear frame 30, and the holder 40 can be supported by the inner circumference of the rear frame 30 in a state that one end portion of the holder 40 passes through the rear frame 30.

The support pad 50 can be rotated along a direction perpendicular to a longitudinal direction of the bridge 15.

Also, the support pad 50 can be rotated at an angle of 0° to 90°.

In the mean time, the glasses according to one embodiment of the present invention may be either general glasses for vision correction or specific glasses (for example, 3D glasses/stereoscopic glasses).

Hereinafter, stereoscopic glasses used herein will be described. The stereoscopic glasses include polarized glasses based on vibration direction or rotation direction of polarized light, time-sharing glasses that alternately display left and right images through switching of the left and right images, and pulfrich glasses that transfer light of different kinds of brightness to left and right eyes.

Referring to FIG. 1, the frame 10 includes a front frame 20 and a rear frame 30.

In one aspect, the front frame 20 includes a plurality lens (L1, L2) holders 21 and 22 and a bridge 25 connecting the lens L1, L2 holders 21 and 22 adjacent thereto. Also, the rear frame 30 includes a bridge 35 connecting a plurality of lens L1, L2 holders 31 and 32 adjacent thereto.

The front frame 20 and the rear frame 30 are assembled to link each lens holder and each bridge with each other. Each of the frames 20 and 30 may be formed of light weight resin having excellent durability or metal. Alternatively, some region of each of the frames 20 and 30 may be formed of metal and the other region of each of the frames 20 and 30 may be formed of resin.

Also, the frame 10 may be provided with a plurality of leg portions (not shown) held in an ear portion of a viewer in a state that the viewer wears the glasses.

Figure 2A:
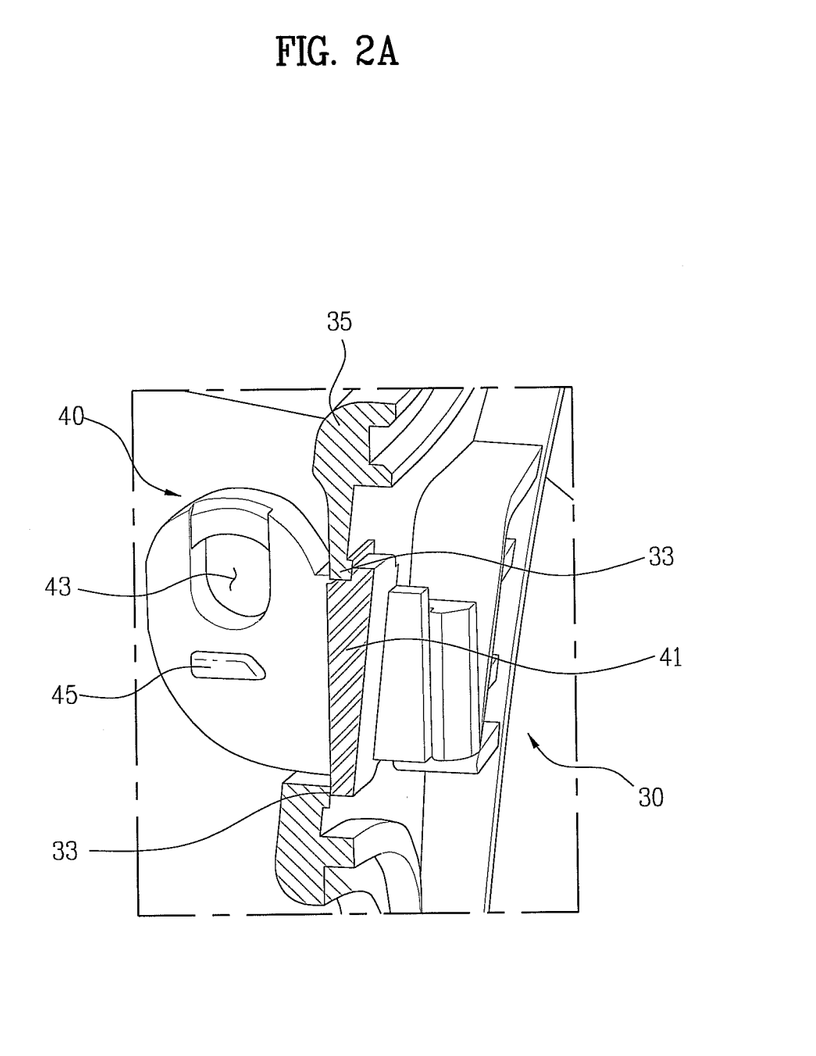
Figure 2B:
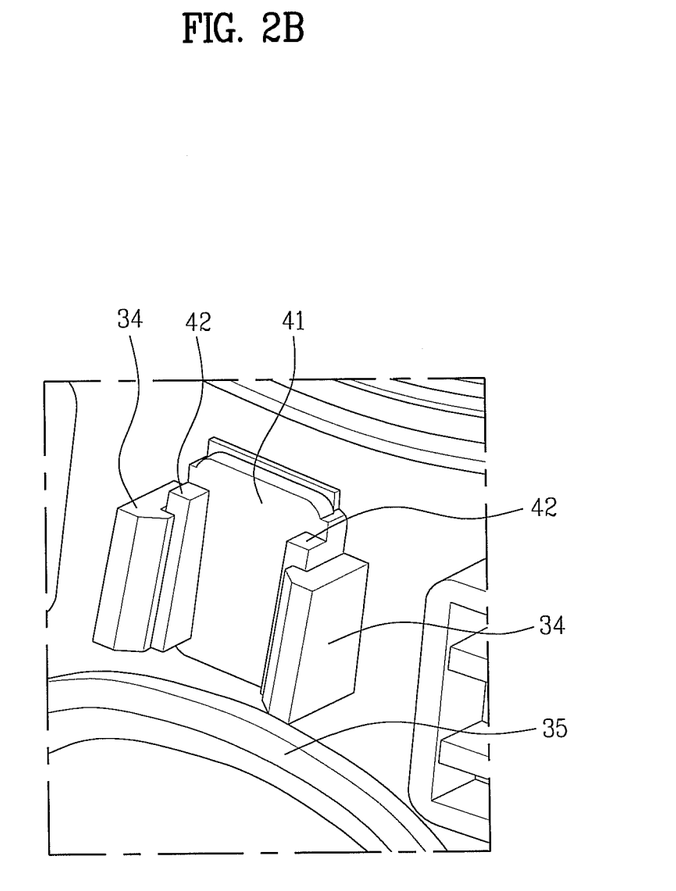
Figure 3:
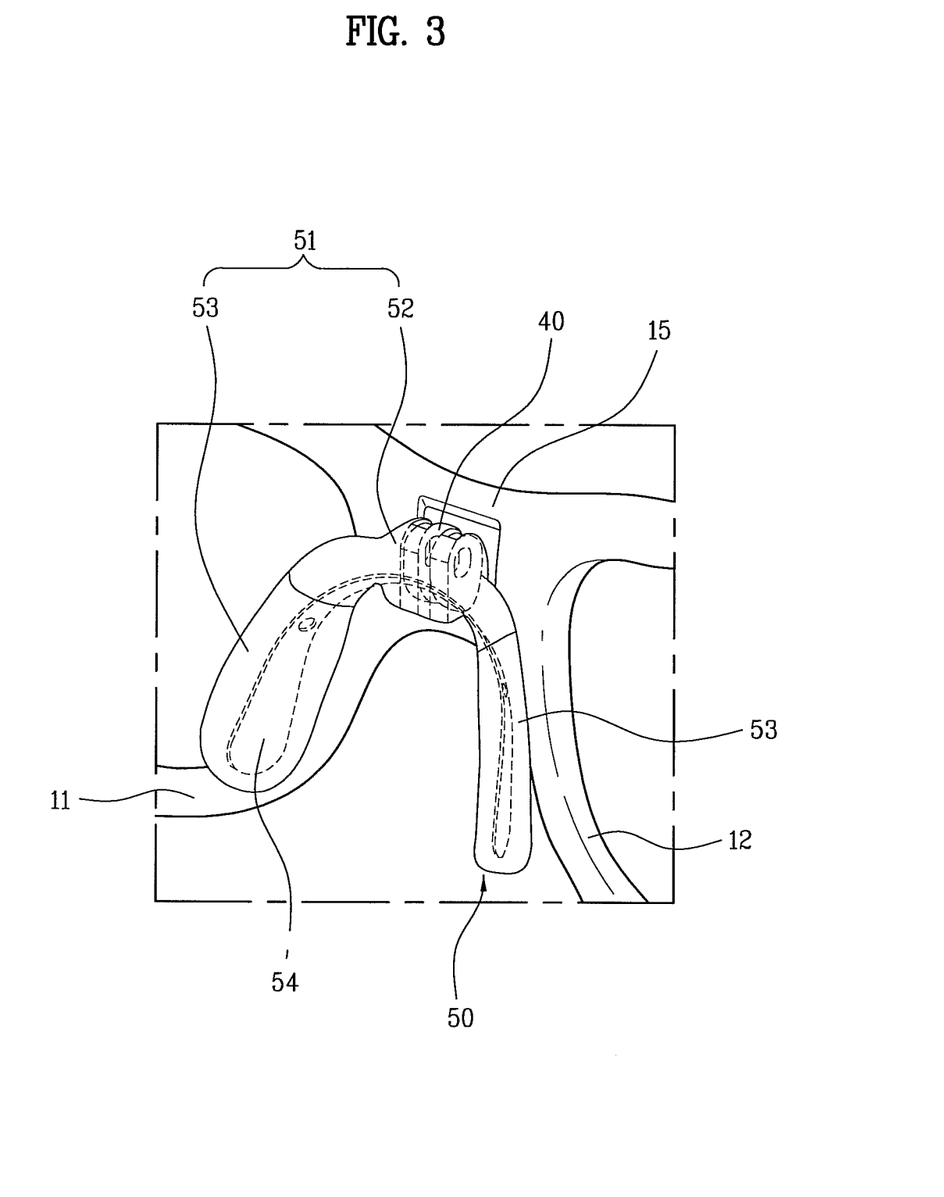

Referring to FIGS. 2A and 2B, the holder 40 can be supported by the inner circumference 33 of the rear frame 30 in a state that one end portion of the holder 40 passes through the rear frame 30.

Also, the holder 40 may be provided with a hook portion 42, and the rear frame 30 may be provided with a catcher portion 34 for inserting the hook portion 42 of the holder 40.

As described above, since the holder 40 can be fixed to the frame 10 without using a fixing means such as a screw, its appearance quality can be improved, and the manufacturing cost can be reduced by the reduced fixing process.

Also, the hook portion 42 provided in the holder 40 and the catcher portion 34 provided in the rear frame 30 may have various shapes for mutual insertion without being limited to the shape and position as shown.

The support pad 50 is generally arranged at a nose portion of a glasses wearer, and serves to uniformly maintain the distance between the lenses L1, L2 and eyes of the glasses wearer and prevent the stereoscopic glasses 1 from slipping down.

The support pad 50 includes a main body 51 that includes a hinge portion 52 rotatably mounted to the holder and tip portions 53 respectively extended with a predetermined curvature from both end portions of the hinge portion 52. In one aspect, the main body 51 has a "∩" shaped structure.

Also, a wire 54 may be arranged in the main body 51 to maintain predetermined rigidity from the shape and wearing state of the main body 51. The wire 54 may be formed of metal.

Also, the tip portion 53 is directly touched with the nose portion of the glasses wearer. Accordingly, the tip portion 53 may affect wearing, it is formed of silicon.

The holder 40 is provided with an insertion hole 43, and the support pad 50 is provided with a hinge shaft inserted into the insertion hole 43. As the hinge shaft 56 is rotatably arranged in the insertion hole, the support pad 50 can rotatably be held in the holder 40.

In the mean time, the present invention is intended to provide stereoscopic glasses that can be prevented from slipping down when the viewer doubly the stereoscopic glasses in a state that he/she wears the glasses for vision correction and can improve fitting of the temple portions.

FIG. 7 to FIG. 8B are diagrams illustrating a use state of stereoscopic glasses 1 according to one embodiment of the present invention. In more detail, FIG. 7 illustrates a use state when a user who does not wear glasses for vision correction wears stereoscopic glasses only, and FIGS. 8A and 8B illustrate a use state when a glasses wearer who wears glasses for vision correction doubly wears stereoscopic glasses.

Referring to FIG. 7, if the user who does not wear glasses for vision correction wears the stereoscopic glasses only, the support pad 50 is arranged at the nose portion of the wearer, and serves to uniformly maintain the distance between the lenses L1, L2 and eyes of the glasses wearer and prevent the stereoscopic glasses 1 from slipping down.

Also, predetermined rigidity and shape are uniformly maintained by the metal wire inserted into the support pad 50, and fitting of the glasses wearer is improved by the tip portions formed of silicon.

In the mean time, the rotational angle of the support pad 50 at the aforementioned use state will be referred to as a minimum rotational angle A1 (see FIG. 5).

Referring to FIGS. 8A and 8B, if a glasses wearer who wears glasses G for vision correction doubly wears the stereoscopic glasses 1, the support pad 50 may interfere with the glasses G for vision correction.

At this time, the support pad 50 may be rotated by the wearer based on the holder 40. Preferably, the support pad 50 is rotated along a direction perpendicular to the longitudinal direction of the bridge 15.

The support pad 50 of which rotation has been finished is arranged at an upper end portion of the glasses G for vision correction. In this case, the stereoscopic glasses 1 can be prevented from slipping down.

In the mean time, the rotational angle of the support pad 50 at the aforementioned use state will be referred to as a maximum rotational angle A3 (see FIG. 5).

In order to improve fitting of the glasses, the support pad 50 should not be rotated at a range smaller than the minimum rotational angle A1 or greater than the maximum rotational angle A3.

Also, in a state that the holder 40 and the support pad 50 are respectively rotated at the minimum rotational angle A1, the maximum rotational angle A3, one or more sub-rotational angles A2 between the minimum rotational angle A1 and the maximum rotational angle A3, it is preferable that the holder 40 and the support pad 50 are maintained at a uniform angle.

Figure 4A:
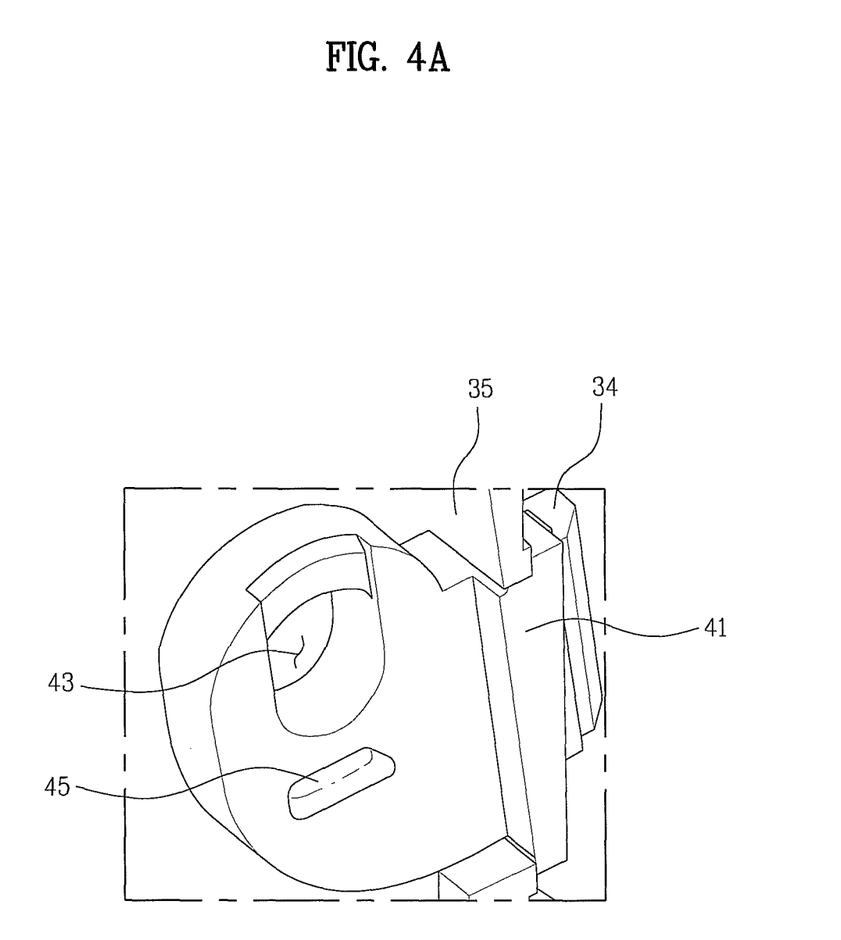
Figure 4B:
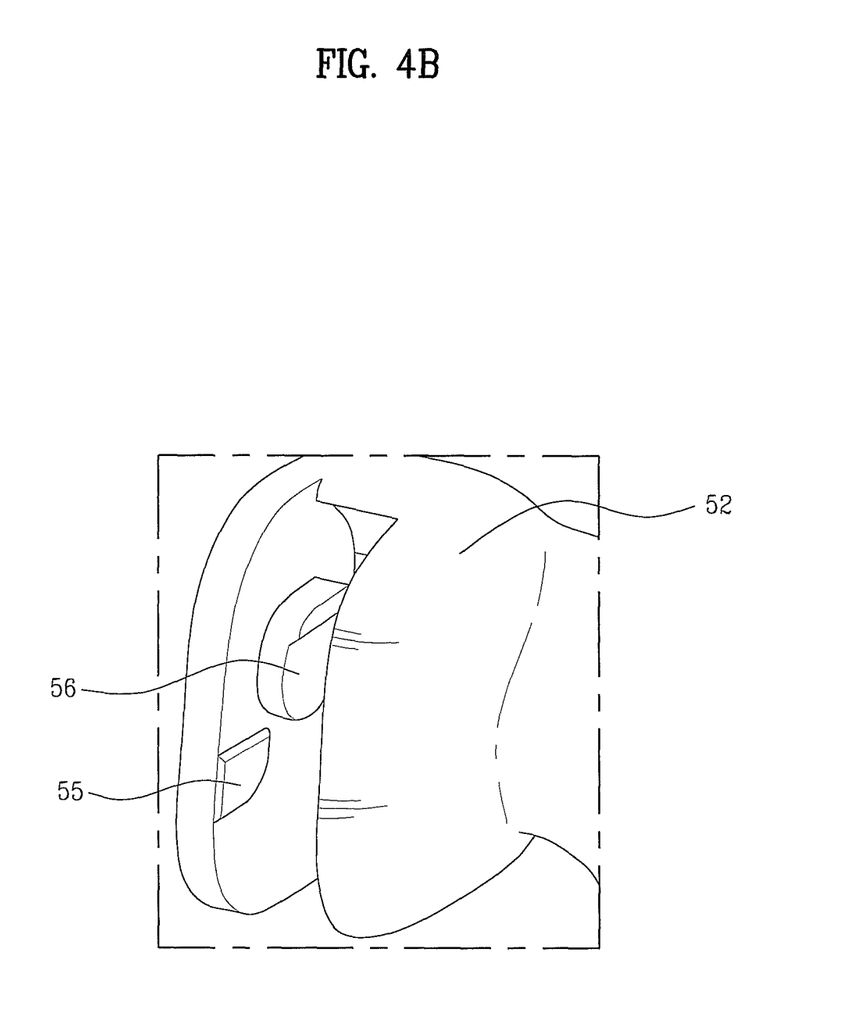

Referring to FIGS. 4A and 4B, the holder 40 and the hinge portion 52 may be provided with first and second protrusions 45 and 55, respectively, for linking different edge portions with each other depending on the rotational angle A1 to A3 of the support pad 50.

Also, the first and second protrusions 45 and 55 can maintain the rotational angle of the support pad 50 in a state that different edge portions are linked with each other depending on a plurality of sub-rotational angles A2 between the minimum rotational angle A1 and the maximum rotational angle A3 of the support pad.

Also, the first and second protrusions 45 and 55 may have a polygonal structure, whereby different edge portions are linked with each other depending on the rotational angle of the support pad 50. For example, each of the protrusions may have a trapezoid structure.

Referring to FIGS. 6A, 6B, and 6C, the hinge shaft provided in the hinge portion 52 of the support pad 50 may be a cam shaft 56. Rotation of the cam shaft 56 may be restricted by the inner circumference of the insertion hole 43 of the holder 40 within the angle range smaller than the minimum rotational angle A1 of the support pad 50 or greater than the maximum rotational angle A3 of the support pad 50.

FIGS. 6A to 6C illustrate that the holder 40 and the support pad 50 are maintained at the minimum rotational angle A1, and FIG. 6B illustrates that the holder 40 and the support pad 50 are maintained at the sub-rotational angle A2.

Referring to FIG. 6A, since the first and second protrusions 45 and 55 of the holder 40 and the support pad 50 are engaged with each other, the minimum rotational angle A1 is maintained in a state that no external force is applied thereto. At this time, the angle of "0°" will be maintained.

In the mean time, even if external force is applied to the support pad 50 towards the rear frame (not shown), as described above, rotation of the cam shaft 56 may be restricted by the inner circumference of the insertion hole 43 within the angle range smaller than the minimum rotational angle A1 of the support pad 50.

Referring to FIG. 6B, if external force is applied to the support pad 50 in a direction far away from the rear frame (not shown), the first protrusion 45 and the second protrusion 55 may partially be overlapped with each other, whereby the frictional force is increased and the support pad 50 is rotated.

Referring to FIG. 6C, after the overlap interval, different edge portions (edge portions different from those corresponding to the minimum rotational angle) of the first and second protrusions 45 and 55 are linked with each other and the corresponding angle is maintained.

In the mean time, since the first and second protrusions 45 and 55 of the holder 40 and the support pad are engaged with each other, the maximum rotational angle A3 is maintained in a state that no external force is applied thereto. At this time, the corresponding angle of 90° will be maintained.

In the mean time, even if external force is applied to the support pad 50 in a direction far away from the rear frame (not shown), as described above, rotation of the cam shaft 56 may be restricted by the inner circumference of the insertion hole 43 within the angle range greater than the maximum rotational angle A3 of the support pad 50.

Also, according to at least one embodiment of the present invention, when the viewer doubly wears the 3D glasses in a state that he/she wears glasses for vision correction, the 3D glasses can be prevented from slipping down and fitting of the temple portions can be improved.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. Glasses, comprising:
    a frame including a bridge positioned between a plurality of lenses;
    a holder mounted to the bridge, the holder having an insertion hole and a first protrusion; and
    a support pad rotatably mounted to the holder, the support pad having a hinge shaft inserted into the insertion hole of the holder and a second protrusion configured to contact with the first protrusion, wherein the first and second protrusions have a plurality of edge portions, respectively, wherein when the support pad is rotated, the first protrusion and the second protrusion partially overlap with each other, and wherein after an overlap interval, one edge portion of the first protrusion is engaged with one edge portion of the second protrusion to maintain a rotational angle of the support pad.

2. The glasses as claimed in claim 1, wherein the support pad includes:
    a main body including a hinge portion and tip portions that extend with a predetermined curvature from both end portions of the hinge portion; and
    a wire arranged in the main body.

3. The glasses as claimed in claim 2, wherein the tip portions are formed of silicon.

4. The glasses as claimed in claim 1, wherein each of the first and second protrusions maintains the rotational angle of the support pad in a state in which the one edge portion of the first protrusion is engaged with the one edge portion of the second protrusion, and wherein the rotational angle is greater than a minimum rotational angle and smaller than a maximum rotational angle.

5. The glasses as claimed in claim 4, wherein the first and second protrusions have a polygonal structure having the plurality of edge portions, respectively.

6. The glasses as claimed in claim 1, wherein the hinge shaft is a cam shaft.

7. The glasses as claimed in claim 6, wherein rotation of the cam shaft is restricted by an inner circumference of the insertion hole when the rotational angle of the support pad is smaller than a minimum rotational angle of the support pad or greater than a maximum rotational angle of the support pad.

8. The glasses as claimed in claim 1, wherein the holder has a hook portion, and wherein the frame has a catcher portion configured to receive the hook portion.

9. The glasses as claimed in claim 8, wherein the frame includes a front frame and a rear frame, and wherein one end portion of the holder is disposed between the front frame and the rear frame.

10. The glasses as claimed in claim 1, wherein the support pad is rotated along a direction perpendicular to a longitudinal direction of the bridge.

11. The glasses as claimed in claim 10, wherein the support pad is rotated at an angle of 0° to 90°.

* * * * *